United States Patent [19]

Legore et al.

[11] Patent Number: 4,910,956

[45] Date of Patent: Mar. 27, 1990

[54] GAS TURBINE OVERTEMPERATURE PROTECTION

[75] Inventors: Robert T. Legore, Palm Beach Gardens; Charles B. Redpath, West Palm Beach; Gary A. Stone, Palm City; George A. White, Stuart, all of Fla.

[73] Assignee: United Technologies Corporation, Hartford, Conn.

[21] Appl. No.: 368,135

[22] Filed: Jun. 16, 1989

Related U.S. Application Data

[63] Continuation of Ser. No. 187,154, Apr. 28, 1988, abandoned.

[51] Int. Cl.⁴ .............................................. F02C 9/28
[52] U.S. Cl. ................................. 60/39.03; 60/39.281
[58] Field of Search .............. 60/39.06, 39.27, 39.281, 60/39.03

[56] References Cited

U.S. PATENT DOCUMENTS

| | | | |
|---|---|---|---|
| 3,002,349 | 10/1961 | Arnett et al. | 60/39.281 |
| 3,006,144 | 10/1961 | Arnett et al. | 60/39.281 |
| 3,053,047 | 9/1962 | Bodemuller | 60/39.281 |
| 3,688,495 | 9/1972 | Fehler et al. | 60/39.281 |
| 4,454,713 | 6/1984 | Meyer et al. | 60/39.281 |

Primary Examiner—Louis J. Casaregola
Attorney, Agent, or Firm—Edward J. Kochey, Jr.

[57] ABSTRACT

Turbine gas temperature, which escalates during a compressor stall, is monitored 46, and compared to a set point temperature 52. If the set point temperature is exceeded, valve 36 is pulsed discharging fuel from line 24 and reducing flow to the combustor. Open and closed intervals are selected to reduce flow, but to avoid flameout. An additional second valve 42 operates in a similar mode in response to an even higher gas temperature.

Engine operation continues in this temperature protection mode until the stall is corrected by whatever means.

17 Claims, 2 Drawing Sheets

GAS TURBINE OVERTEMPERATURE PROTECTION

This is a continuation of application Ser. No. 07/187,154, filed Apr. 15, 1988, now abandoned.

TECHNICAL FIELD

The invention relates to gas turbine engines and in particular to protection of the turbine from excessive damaging gas temperatures during a compressor stall.

BACKGROUND OF THE INVENTION

Gas turbine engines are inherently designed to operate with high gas turbine temperatures. For maximum efficiency normal operation approaches the maximum allowable temperature of the materials. Temperatures above these limits will lead to permanent damage.

Fuel control systems deliver metered fuel to the combustor. While the pilot controls the fuel to obtain the desired power, the automatic control system includes a minimum flow commensurate with minimum normal operating conditions.

Axial flow compressors are subject to an operating condition commonly referred to as compressor stall. When the angle of attack of the blades is such that the air suddenly separates from the blades, the blades suddenly cease to impart velocity pressure to the air. This causes a sharp reduction in the output of the compressor producing a significantly reduced airflow. The automatic control system sets fuel flow at or near the minimum setting and continued introduction of the minimum fuel amount in conjunction with this reduced airflow leads to excessively high temperatures in the combustor and the turbine.

Various operating condition can cause the stall, for instance, ingestion of hot gases into the engine due to the firing of a rocket or gun from an aircraft, extreme aircraft maneuvers, or departures. It is known that the stall may sometimes be eliminated by reducing fuel flow to the combustor thereby decreasing the back pressure on the compressor. This can be done by the pilot if he has time to give attention to the problem. He quickly retards the power request which may decrease the fuel to a low level.

Schemes to automatically recover from a stall are known, for instance U.S. Pat. No. 3,540,214. Here a rapid fuel flow reduction is automatically achieved by dumping fuel from the supply line in times in the order of hundredths of a second. This is done in response to a rate of pressure change within the combustor. The system therefore operates very quickly and is a one shot try at recovering from the stall.

An aircraft encounters a multiplicity of operating conditions. This can vary from high altitude low velocity flight, to low altitude high velocity flight. In each of these situations different air densities and flow rates are encountered and the particular fuel reduction required to recover from compressor stall in one condition will not be suitable for all others. Engine testing has demonstrated that fuel flow reduction schemes can actually inhibit stall recovery in some compression systems. Accordingly any stall recovery system is not sufficiently reliable to perform under all circumstances.

Should the engine fail to recover from the stall and then overheat, a pilot can face a difficult decision when occupied by other matters. He must either shut down the engine or leave it operating and hope that the damage can be tolerated. One must also consider that excessive reduction in fuel flow, whether accomplished automatically or manually, will lead to flame out of the engine. This would require additional pilot effort.

SUMMARY OF THE INVENTION

It is an object of the invention to maintain safe operation of an engine with overtemperature protection during emergency compressor stall conditions. This simple lightweight inexpensive system accomplishes this without adversely affecting the ability to recover from a stall.

A gas turbine engine operates normally with a pressurized fuel supply line conveying fuel to a combustor. A fuel control system supplies at least a minimum flow of fuel to the line.

A gas temperature of the turbine, preferably at the exit, is continuously sensed. This temperature is compared to a first set point limiting temperature and a signal produced when the gas temperature exceeds this set point. When the temperature is exceeded a first valve is actuated discharging fuel from the supply line, preferably back to the fuel pump suction. This valve is opened only intermittently for one (1.0) second pulses and then closed for 0.2 seconds. This provides an overall reduction in fuel flow but maintains sufficient flow to avoid flameout within the combustor.

In response to exceeding a second set point temperature at a higher temperature level, a second valve is actuated with open pulses of 0.4 seconds with closed intervals of 0.2 seconds. Therefore, in those flight conditions where the first valve is not sufficient to reduce the temperature the second valve increases the reduction of fuel flow to the combustor, while still maintaining the intermittent nature of the fuel reduction.

DESCRIPTION OF THE PREFERRED EMBODIMENT

Figure 1:
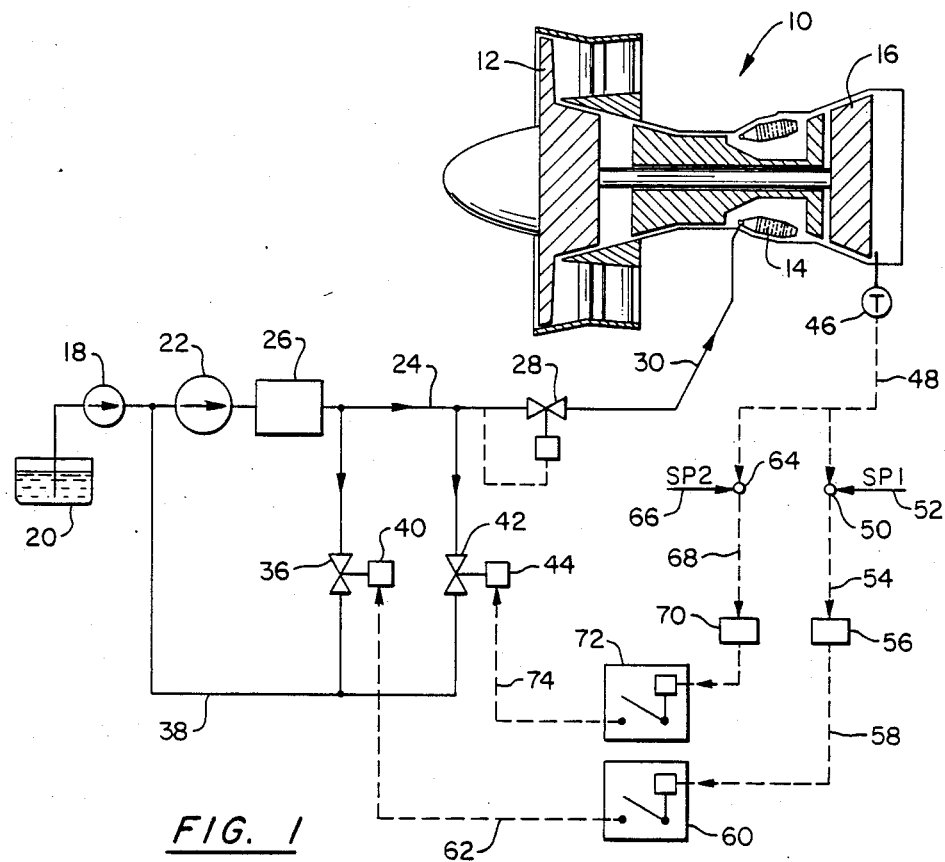
FIG. 1 is a schematic of the system.

FIG. 1 schematically illustrates a gas turbine engine 10 wherein axial compressor 12 supplies air to combustor 14 in which fuel is burned passing the hot gases to gas turbine 16. A booster pump 18 takes fuel from fuel supply 20 passing it to fuel pump 22 for delivery through fuel line 24 to combustor 14. A conventional fuel control system 26 provides a metered fuel flow through the fuel line 24. A pressurizing valve 28 operates to maintain a preselected pressure in line 24 and is located in the fuel line 30 which is the main fuel supply to combustor 14.

A first valve 36 is arranged to discharge fuel from line 24 passing it through line 38 to the suction of fuel pump 22. Actuator 40 controls this valve to either the full open or full closed position.

A second valve 42 which may be identical to valve 36 is arranged in parallel with valve 36 to also discharge fuel from line 24 and return it to the pump suction. Valve 42 is actuated to the full open or full closed position by actuator 44.

The gas temperature leaving gas turbine 16 is continuously monitored by temperature sensing means 46. An electrical signal representative of this temperature is passed through control line 48 to point 50 where it is compared to a signal representing first set point temperature 52.

If the sensed gas temperature exceeds the set point temperature, a control electrical signal is passed through line 54 to a signal pulsing means 56 and a pulsed signal passed through line 58 to intermittently activate switch 60 supplying the 28.v control signal through line 62 to first actuator 40. The signal is preferable pulsed to open valve 36 for one second and maintained at closed for at least 0.2 seconds whenever the gas temperature exceeds the limit of this first set point.

Control line 48 also supplies the sensed temperature signal to point 64 where it is compared with a second higher set point temperature 66. In the event that the sensed gas temperature also exceeds this set point limit a control electrical signal is passed through line 68 to a pulsing means 70 with a pulsed signal passed to switch 72. This then intermittently sends a 28.v control signal through line 74 to second actuator 44 intermittently operating valve 42. This second pulsing means 70 preferably supplies signals opening valve 42 for a time period of 0.4 seconds separated by 0.2 seconds.

Figure 2:
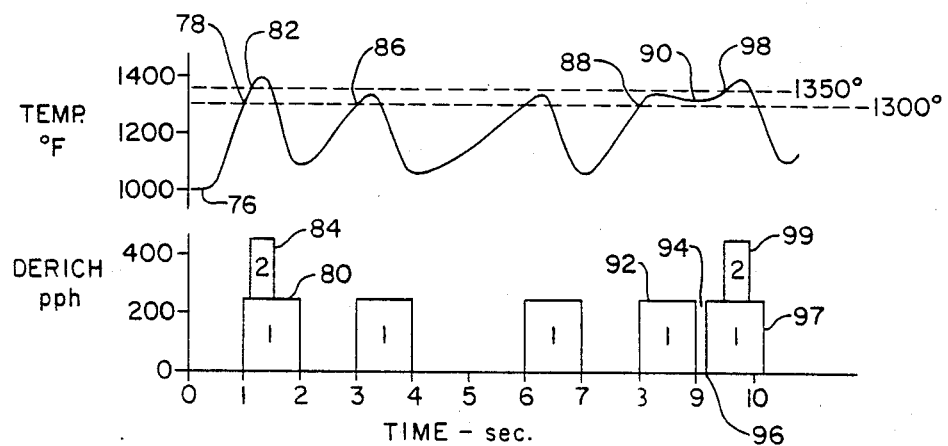
FIG. 2 is a plot of temperature and valve flow versus time.

FIG. 2 graphically illustrates the operation of the system in response to a temperature perturbation. The plot of line 76 versus time represents the turbine exit gas temperature. The lower graph shows the derichment fuel flow as a function of time. With the turbine normally operating, this temperature is shown at 1,000 F. and the temperature excursion occurs whereby at point 78 the temperature reaches 1,300 F. which is the set value of set point 52. Therefore, at time 1 second, first valve 36 is opened producing a flow shown by block 68 existing for one second.

In this particular case, however, the temperature continues to rise so that at point 82 the temperature reaches 1,350 F. at about 1.1 seconds. Accordingly, since 1,350 F. is the set value of set point 66, valve 42 is also opened resulting in the additional discharge flow shown by block 84, this flow continuing for 0.4 seconds.

It will be appreciated that the discharge flows passing through valves 36 and 42 remove a potion of the metered flow discharged from fuel control 26, thereby resulting in a decrease in fuel flow to the combustor 14. Since pressurizing valve 28 operates to maintain back pressure, the flow reduction is predominantly in the main nozzles and turbine temperature drops to a safe level.

In accordance with the invention, after valve 36 has pulsed for one second as shown in block 80 it must wait 0.2 seconds before starting a second pulse. In accordance with the temperature curve shown on FIG. 2, the temperature at this time is below the set point of 1,300 F. and accordingly, the valve does not reopen until point 86 when the temperature is again reached. Since the temperature here never reaches 1,350 F., valve 42 is not again opened.

The pulsing of valve 36 reduces the fuel flow for the purpose of decreasing temperature. The pulse is limited to 1 second (with a maximum of 2 seconds) for the purpose of avoiding flameout in the combustor. The time between pulses of 0.2 seconds (and preferably not less than 0.1 second) supplies sufficient continuing fuel to maintain combustion and avoid flameout.

Under most stall conditions it is expected that only valve 36 would be required. However, certain operating conditions may be reached which will require a further reduction in fuel flow. Only in this case at the temperature level of 1,350 F. does valve 42 come into operation further reducing the fuel flow to the combustor.

It can be seen from FIG. 2 that at the time period of approximately 8 seconds, valve 36 is opened when the temperature at point 88 reaches the set point of 1,300 F. At point 90 occurring one second later, the temperature still exceeds 1,300 F. The flow caused by the pulse is shown by block 92 and it can be seen that there is a interval 94 of 0.2 seconds where this valve is closed to permit a temporary full flow rate to the combustor. Accordingly, at time 96 another pulse 97 occurs. During this pulse, the temperature at point 98 reaches the 1,350 F. limit and pulse 99 occurs by the opening of valve 42. The temperature then drops to a safe level.

This system may be used in conjunction with a conventional stall recovery system. Should the engine recover from the stall before the temperature escalation the overtemperature protection system will not activate. If the temperature escalates this system will operate independently of other systems on the engine. The present system may or may not initiate a stall recovery. Such recovery is, however, not the purpose of this system. The system is intended to maintain operation at a safe temperature level until a stall recovers whether by natural compression system dynamics or by automatic or manual stall recovery techniques.

Figure 3:
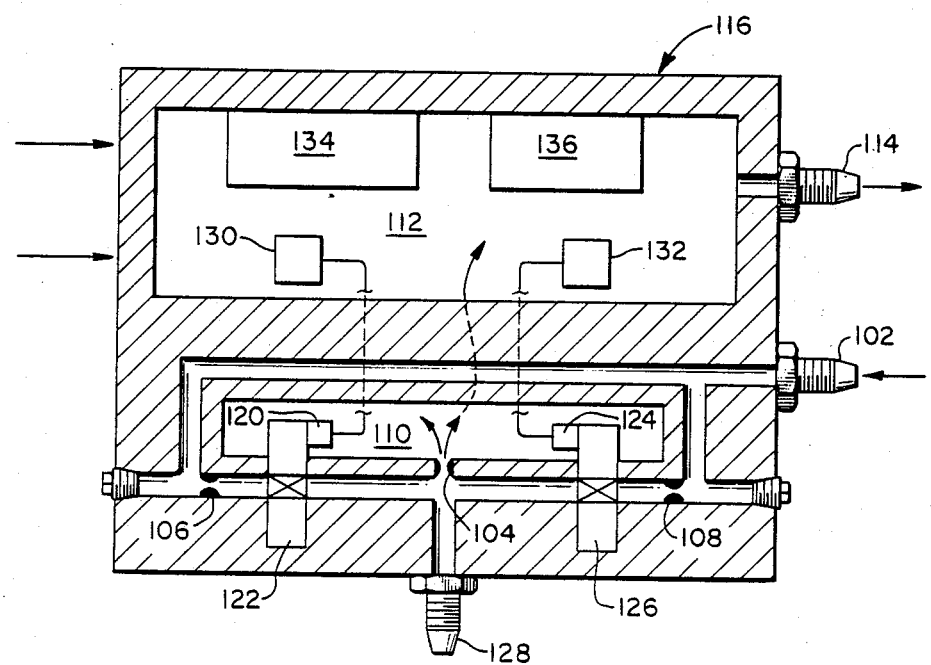
FIG. 3 is a section through a compact hardware arrangement.

FIG. 3 illustrates a compact apparatus whereby the temperature control operation may be carried out. Fuel flow from line 24 (FIG. 1) enters through inlet 102 passing out to the pump through outlet 128 when valve 122 or 126 is open. A bleed flow passes through bleed 104 at all times to chamber 110 and thence through chamber 112 passing through outlet 114 to return to the pump inlet. This bleed low cools the electronic equipment located within control box 116.

An actuator 120 operates a solenoid controlling valve 122 while an actuator 124 controls valve 126. With either of these valves open, a flow occurs out through outlet 128 discharging fuel from the main fuel line. This may pass to either the pump inlet or an inner stage location. This is equivalent to the flow through line 38 of the schematic in FIG. 1. A first switch 130 is the equivalent of switch 60 and a second switch 132 is the equivalent of switch 72. A temperature decision box 134 includes the set points 64 and 50 while a solenoid timing box 136 includes the pulsing means 56 and 70.

The short derichment pulses in response to turbine overtemperature are effective over the entire flight envelope. Turbine temperature is limited without flameout and the engines ability to recover from a stall is not impacted. The system is simple, lightweight and inexpensive. It may easily be added to an existing system.

We claim:

1. In a gas turbine engine having a pressurized fuel supply line for supplying fuel to a combustor and a fuel control system supplying a predetermined minimum flow of fuel commensurate with minimum normal operation to said line, an apparatus for further intermittently reducing the fuel flow to said combustor during a stall condition comprising:

means for sensing a gas temperature of the turbine;
   means for reducing the fuel flow to said combustor below said minimum flow comprising a valve arranged to divert a portion of said minimum flow from said combustor by discharging a portion of said fuel flow from said supply line to a location other than said combustor;

an actuating means for actuating said valve;

a comparing means for comparing said sensed gas temperature to a preselected temperature; and pulsing means for intermittently energizing said actuating means in response to said comparing means when said sensed temperature exceeds said preselected temperature, the open pulses of said valve being sufficiently short to avoid flame out in said combustor.

2. In a gas turbine engine having a pressurized fuel supply line for supplying fuel to a combustor and a fuel control system supplying a predetermined minimum flow of fuel to said line an apparatus comprising:

means for sensing a gas temperature of the turbine;

a first valve arranged to discharge fuel flow from said supply line to a location other than said combustor;

a first actuating means for actuating said first valve;

a first comparing means for comparing said sensed gas temperature to a first preselected temperature;

first pulsing means for intermittently energizing said first actuating means in response to said first comparing means when said sensed temperature exceeds said first preselected temperature;

a second valve arranged to discharge fuel from said supply line to a location other said combustor;

a second actuating means for actuating said second valve;

a second comparing means for comparing said sensed gas temperature to a second higher preselected temperature; and second pulsing means for intermittently energizing said second actuating means in response to said second comparing means when said sensed temperature exceeds said second preselected temperature.

3. In a gas turbine engine having a pressurized fuel supply line for supplying fuel to a combustor and a fuel control system supplying a predetermined minimum flow of fuel to said line an apparatus comprising:

means for sensing a gas temperature of the turbine;

a first valve arranged to discharge fuel flow from said supply line to a location other than said combustor;

a first actuating means for actuating said first valve;

a first comparing means for comparing said sensed gas temperature to a first preselected temperature;

first pulsing means for intermittently energizing said first actuating means in response to said first comparing means when said sensed temperature exceeds said first preselected temperature;

said first pulsing means including means for opening said first valve for a time not exceeding two seconds and closing said first valve for a time not less than 0.1 seconds.

4. An apparatus as in claim 3:

said first pulsing means including means for opening said first valve for a time not exceeding one second and closing said first valve for a time not less than 0.2 seconds.

5. An apparatus as in claim 2:

said first pulsing means including means for opening said first valve for a time not exceeding two seconds and closing said first valve for a time not less than 0.1 seconds; and said second pulsing means including means for opening said second valve for a time not exceeding 0.5 seconds and closing said second valve for a time not less than 0.3 seconds.

6. An apparatus as in claim 2:

said first pulsing means including means for opening said first valve for a time not exceeding one second and closing said first valve for a time not less than 0.2 seconds; and said second pulsing means including means for opening said second valve for a time not exceeding 0.4 seconds and closing said first valve for a time not less than 0.2 seconds.

7. In a gas turbine engine having a pressurized fuel supply line for supplying fuel to a combustor and a fuel control system supplying a minimum flow of fuel commensurate with minimum normal combustor operation to said line, an apparatus for further and intermittently reducing the fuel flow to said combustor during a stall condition comprising:

sensing means for sensing a gas temperature within said turbine;

comparing means for determining when said gas temperature exceeds a first preselected limit; and means for reducing the fuel flow to said combustor below said minimum flow comprising means for intermittently diverting a portion of said minimum flow from said combustor by discharging fuel from said line to a location other than said combustor in response to said first comparing means, whereby fuel flow to said combustor repeatedly returns to said minimum flow, with intervals of further reduced flow.

8. In a gas turbine engine having a pressurized fuel supply line for supplying fuel to a combustor and a fuel control system supplying a minimum flow of fuel to said line an apparatus comprising:

sensing means for sensing a gas temperature within said turbine;

first comparing means for determining when said gas temperature exceeds a first preselected limit;

first means for intermittently discharging fuel from said line to a location other than said combustor in response to said first comparing means;

second comparing means for determining when said gas temperature exceeds a second higher preselected limit; and second means for also intermittently discharging fuel from said line to a location other than said combustor in response to said second comparing means.

9. In a gas turbine engine having a pressurized fuel supply line for supplying fuel to a combustor and a fuel control system supplying a minimum flow of fuel to said line an apparatus comprising:

sensing means for sensing a gas temperature within said turbine;

first comparing means for determining when said gas temperature exceeds a first preselected limit; and first means for intermittently discharging fuel from said line to a location other than said combustor in response to said first comparing means;

said first means for intermittently discharging fuel comprising means for discharging fuel in time increments not exceeding two seconds separated by a time of at least 0.1 seconds.

10. An apparatus as in claim 7:

said first means for intermittently discharging fuel comprising means for discharging fuel in time increments not exceeding one second separated by a time of at least 0.2 seconds.

11. An apparatus as in claim 8:

said first means for intermittently discharging fuel comprising means for discharging fuel in time increments not exceeding one second separated by a time of at least 0.1 seconds; and said second means for intermittently discharging fuel comprising means for discharging fuel in time increments not exceeding 0.5 seconds separated by a time of at least 0.1 seconds.

12. An apparatus as in claim 8:

said first means for intermittently discharging fuel comprising means for discharging fuel in time increments not exceeding one second separated by a time of at least 0.2 seconds; and said second means for intermittently discharging fuel comprising means for discharging fuel in time increments not exceeding 0.4 seconds separated by a time of at least 0.2 seconds.

13. A method of operating a gas turbine engine comprising:

supplying fuel to a fuel line feeding a combustor;
monitoring a gas temperature in the gas turbine; and
intermittently discharging a portion of the fuel from said fuel line to a location other than said combustor, in response to an excessive gas temperature, in first pulses not exceeding two seconds, said first pulses spaced at least 0.1 second.

14. The method of claim 13, further comprising:

intermittently discharging an additional portion of the fuel from said fuel line to a location other than said combustor, in response to a greater excessive gas temperature, in second pulses not exceeding 0.5 seconds, said second pulses spaced at least 0.1 seconds.

15. The method of claim 13 wherein the step of intermittently discharging a portion of the fuel comprises:

intermittently discharging a portion of the fuel from said fuel line in response to an excessive gas temperature, in first pulses not exceeding one second, said pulses spaced at least 0.2 seconds.

16. The method of claim 15, further comprising:

intermittently discharging an additional portion of the fuel from said fuel line to a location other than said combustor, in response to a greater excessive gas temperature, in second pulses not exceeding 0.4 seconds, said second pulses spaced at least 0.2 seconds.

17. A method of operating a gas turbine engine comprising:

supplying fuel to a fuel line feeding a combustor;
establishing a minimum fuel flow to said fuel line; commensurate with minimum normal combustor fuel flow;

monitoring a gas temperature in the gas turbine; and
intermittently bleeding a portion of the fuel from said fuel line to a location other than said combustor, in response to an excessive gas temperature, in briefly spaced pulses, whereby fuel flow to said combustor repeatedly returns to said minimum flow, with intervals of below minimum flow.

* * * * *